March 29, 1932.  R. SCHNITZER  1,851,134

WORK FEED CONTROL

Filed Jan. 25, 1926

Richard Schnitzer
Inventor

Attorneys.

Patented Mar. 29, 1932

1,851,134

UNITED STATES PATENT OFFICE

RICHARD SCHNITZER, OF ZURICH, SWITZERLAND, ASSIGNOR TO A. G. BROWN BOVERI & CIE., OF BADEN, SWITZERLAND, A JOINT-STOCK COMPANY

WORK FEED CONTROL

Application filed January 25, 1926, Serial No. 83,481, and in Germany January 30, 1925.

This invention relates to a method and to apparatus for controlling the feed of work to a working element or to a plurality of working elements.

The general purpose of the invention is the automatic control of the work feed in such fashion as to maintain the load on the working element, or the respective working elements, substantially constant.

Another object is the provision of apparatus for effecting such regulation, which will be relatively simple in construction, immediate and certain in operation, and positive in its effect.

Other and further objects of the invention will be pointed out hereinafter, indicated in appended claims, or obvious to one skilled in the art upon an understanding of the present disclosure.

In various types of machines, and particularly in machines designed for the abrading, grinding or reduction of material, the work is fed to a working element in the nature of a cutter or grinder which acts forcibly upon the work in a direction transversely to that in which the work is fed. This transverse force is transmitted thru the work and sustained by the work holder which holds the work to the action of the working element. The present invention provides for an arrangement of the work holder whereby at least a portion of it is movable to a varying degree under the transverse pressure transmitted to it from the working element through the material in the work holder, and for any suitable regulating means, responsive to such movement of the work holder, for varying the rate or pressure at which the work is fed, or the load upon the working element.

For the purpose of this application I show in the accompanying drawings forming a part of this specification and described herein, certain forms of apparatus in which the invention may be embodied and practised, but it is to be understood that these are presented for purpose of illustration only, and are not to be accorded the effect of limiting the invention claimed, short of its true and most comprehensive scope in the art. In the drawings Fig. 1 is a diagrammatic illustration in the nature of a sectional elevation of a wood pulp grinder illustrating an arrangement of the work holder or magazine in association with an element of a regulating means.

Figure 1:
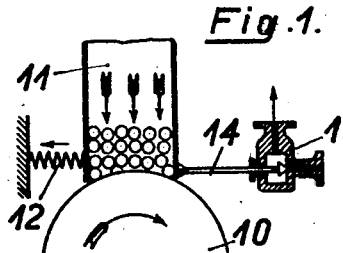
Figure 2:
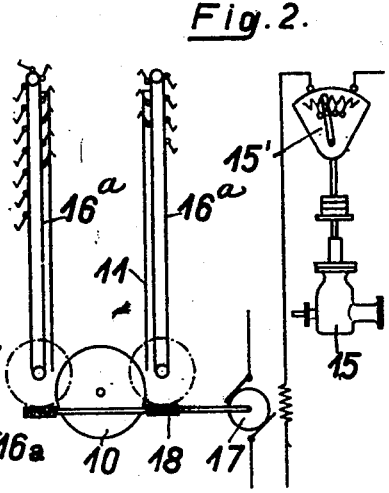
Fig. 2 is a diagrammatic illustration showing in conventional fashion a relationship of regulating means with means for feeding the work to the working element or grinder.

The nature of the invention may be understood more in detail by reference to these illustrative embodiments which, as stated above, show the invention as applied to a machine for reducing wood to pulp for use in paper manufacture or the like. In the portion illustrated in Fig. 1 let it be understood that numeral 10 designates the grinder or working element of the machine, to which the work is fed through the work holder or magazine 11. The grinder being driven in the direction indicated by the arrow, it is obvious that it exerts a circumferential force against the material in the work holder, part of which force is consumed in friction and part transmitted through the material to the magazine in a direction tending to move the latter laterally. The magazine is so mounted as to be susceptible of a moderate lateral movement in the direction of the circumferential force exerted by the grinder and is restrained against such movement by a spring 12. By an operating connection 14 such movement of the magazine is rendered effective upon an element 15 of a regulating device arranged to control the feed of the material to the grinder. An arrangement of the regulating device and the feed mechanism is illustrated in Fig. 2, wherein the latter is shown as comprising chains 16ª carrying flights or hooks which transmit the wood towards the grinder, said chains being actuated by the motor 17 through the medium of driving connections 18. The speed of the motor 17 is controlled by the regulating device 15'. By virtue of the arrangement, in the event the load imposed on the grinder increases to the point where the reaction, transmitted through the wood, is sufficient to move the magazine 11 against the influence of the spring 12, said movement of the magazine, transmitted through its operative connection with the regulating device will be effective to decrease the speed of the motor 17 and the rate or pressure at which the wood is fed to the grinder.

Figure 3:
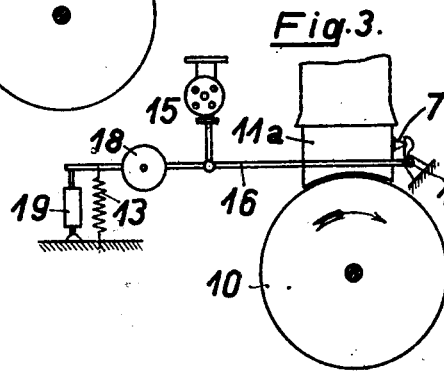
Fig. 3 is a diagrammatic illustration of another form of device for actuating the regulating means from the magazine or work holder of a wood pulp grinder.

In Fig. 3 is illustrated a modified construction of operative connection between the work holder and regulating device. In this form the portion 11ª of the work holder is movable and is effectively associated with the shaft end of the bell-crank lever 16 by means of the knife edge 7. The bell-crank lever is pivoted at 16ª and operatively connected with the control element 15 and arranged to oppose the resistance of the spring 13 and adjustable weight 18 to the movement of the magazine portion 11ª. The dashpot 19 is provided to steady the action of the lever.

Figure 4:
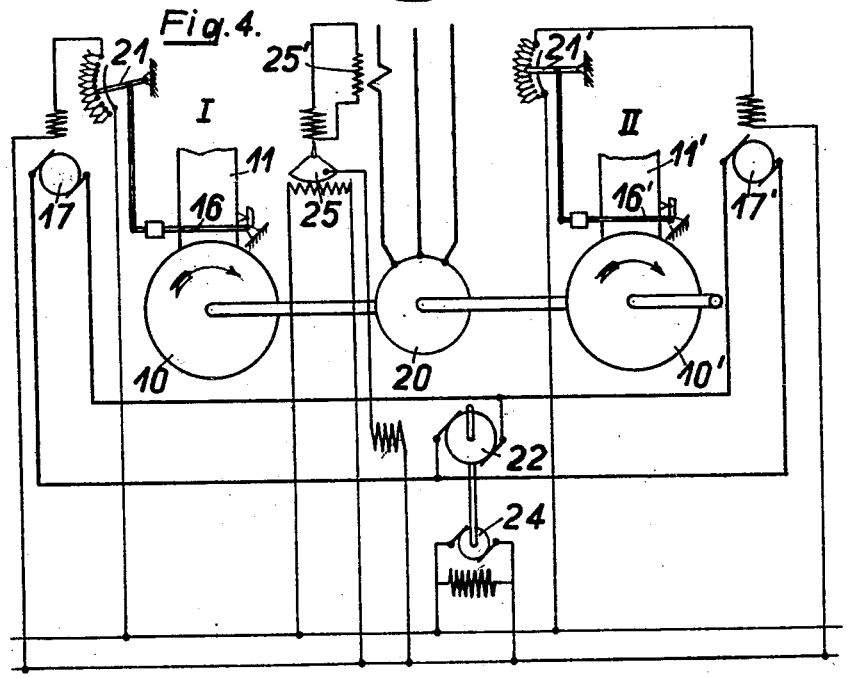
Fig. 4 is a diagrammatic illustration of a layout for the control of two associated grinders.

In Fig. 4 is illustrated an arrangement for the regulation and uniform distribution of the load to associated grinders I and II. The working elements 10 and 10' of the respective grinders are driven conjointly by the three-phase motor 20, the respective work holders 11 and 11' having operative connection through their respective levers 16 and 16' with regulators 21 and 21' which control the work-feeding motors 17 and 17' which feed material to the respective grinders. These motors take their supply from the generator 22, in Ward Leonard connection. Generator 22 is coupled to the exciter dynamo 24 which energizes the fields of the feed motors 17 and 17' and the Ward Leonard generator 22. The effectiveness of the generator 22 is rendered responsive to the load demand of the main motor 20 through the medium of the regulator 25. Increase of the load imposed by the grinders 10 and 10' jointly on the motor 20, results in an increase of its current demand, which, through the inductive connection 25' of the regulator 25, effects a compensating adjustment of the latter, suitable to influence the generator 22 in such a fashion as to slow up the feed motors 17 and 17'. By virtue of the arrangement shown, therefore, not only is the total load on the main driving motor regulated to constancy, but the total load is uniformly distributed between the work grinders.

It will be appreciated that the application of my invention will be effective to increase the total efficiency of the working apparatus by maintaining the load substantially constant at an optimum value. While I have illustrated the invention as employed for the regulation of wood pulp grinders, it is obvious that it is similarly applicable to machines designed for various other particular purposes.

What I claim is:—

1. In feed-control apparatus of the character described, a working element, means for holding material for feeding to said element, said holding means being supported for movement due to occurring drag action between the material and said element, means yieldingly restraining said holding means against such movement, and means responsive to conditions whereat such drag action is sufficiently great to overcome the restraining action of said restraining means and effect such movement of said holding means, said third-named means being operable upon occurrence of such conditions to control the rate of feed of material to said element.

2. Feed control apparatus comprising in combination, a movable working element, a material holder, means for feeding material into said holder to be acted upon by said element, said holder being movable responsive to action of said element upon said material within said holder, and means responsive to movement of said holder to control said feeding means.

3. Feed control apparatus comprising in combination, a movable working element, an electrical means operative to move said element, a material holder, an electrical means operative to feed material into said holder to be acted upon by said element, a control means for the last said electrical means and operative to affect the same to vary the rate of the feeding of material into the said holder, the said holder being movable responsive to action of said element upon the material fed thereinto, and means operative responsive to movement of said holder to operate the said control means to affect the last said electrical means.

4. Feed control apparatus comprising in combination, a plurality of working elements, an electrical means common to said elements and disposed to operate the same, a material holder individual to each of said plurality of elements, an electrical means individual to each of said holders and operative to feed material into the same to be acted upon by the associated one of said elements, a control means individual to each of last said electrical means and operative to effect the same to vary the rate of the feeding of material into the associated one of said holders, each of said holders being movable responsive to action of the associated one of said elements upon the material therein, and means individual to each of said holders and actuated responsive to said movement thereof to actuate the said control means to affect the associated last said electrical means.

5. Feed control apparatus comprising in combination, a rotatable working element, an electric motor operative to rotate the said element at varying rates of speed, a source of current supply for said motor, a material holder, an electric motor operative to feed material into the said holder at varying rates to be acted upon by said element, a dynamo electric machine operative to supply operating current of varying potential to the last said motor, means operative in dependence upon the supply of current from the first said source to the first said motor to vary the potential of the current feed by the said generator to the last said motor to vary the speed of the latter, the said holder being movable responsive to action of said element upon material fed into the said holder responsive to operation of the said last said motor, and control means operative responsive to said movement of said holder to affect the said last said motor to vary the rate at which material is fed into the said holder.

In testimony whereof I have hereunto subscribed my name at Zurich, Switzerland, on the 11th day of January, A. D. 1926.

RICHARD SCHNITZER.